March 15, 1927. 1,621,440
E. J. STODDARD
PROCESS AND APPARATUS FOR GERMINATING SEED
Filed Aug. 10, 1925

INVENTOR.
Elliott J Stoddard
BY
ATTORNEY.

Patented Mar. 15, 1927.

1,621,440

UNITED STATES PATENT OFFICE.

ELLIOTT J. STODDARD, OF HIGHLAND PARK, MICHIGAN.

PROCESS AND APPARATUS FOR GERMINATING SEED.

Application filed August 10, 1925. Serial No. 49,199.

My invention relates to a process and apparatus for germinating seed and objects of my improvements are to avoid displacing the seed while watering it, to keep the seed moist, to protect it from the direct sunlight while permitting sufficient light for germination.

I secure these objects in the device illustrated in the accompanying drawing and by the process hereinafter described.

$a, a$, indicates the surface of this seed bed, which for convenience is shown with a vertical section in front. $b$, is a V-shaped groove or drill in the seed bed $a$. $c$, is a construction of the shape in cross section of an inverted trough; the upper portion of the trough $c$ is shaped to form a ridge $c^2$ in the shape of an inverted V. $c^3, c^3$, are apertures formed through the wall of the trough $c$; these apertures are formed by punching out the material of the wall of the trough leaving a tongue $c^4$ at each end slightly turned outward and underneath these tongues is inserted a piece of translucent material $d$ which closes the aperture $c^3$.

Figures 1, 3:
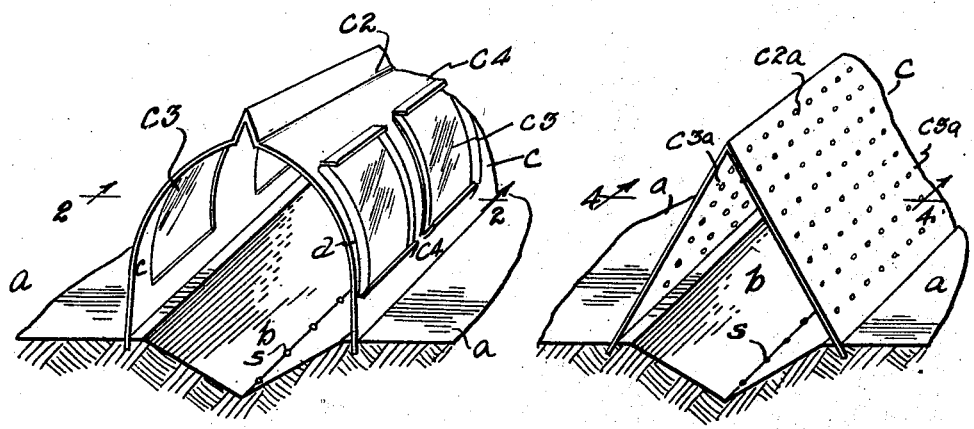
Figure 1, is a perspective view of a portion of an apparatus embodying my invention and the adjacent seed bed.
Figure 3, is a view similar to Figure 1 showing the modified construction.
Figures 2, 4:
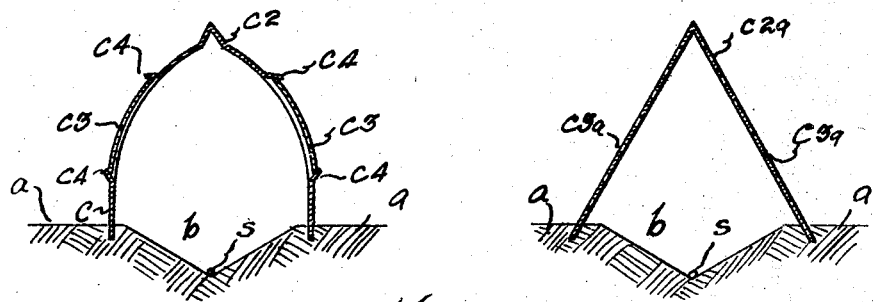
Figure 2, is a section of the same through one of the windows.
Figure 4, is a cross section of a portion shown in Figure 3.

In Figure 3, the trough is shown of a V-shaped cross section and having small apertures $c^{3a}$ punched through the wall thereof.

Figures 5, 6:
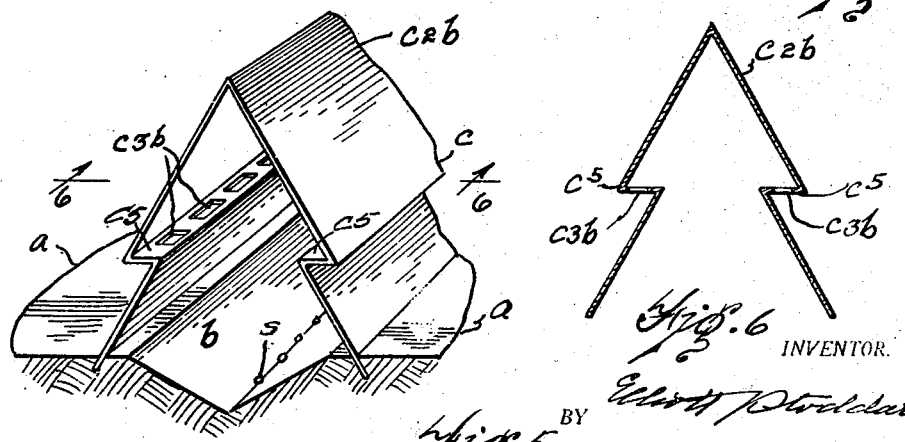
Figure 5, is a perspective view similar to Figure 1, showing a second modified construction.
Figure 6, is a cross section of the construction of Figure 5, the section being taken so as to pass through one of the apertures $c^{3b}$.

In Figure 5, a second form of the trough is shown having the offsets $c^5$ through which apertures $c^{3b}$ are formed; the walls of the off-set $c^5$ are approximately horizontal and are shielded by the overhanging walls of the upper portion of the trough $c$, the upper portion of which constitutes the ridge $c^{2b}$.

The method of using the above described device is as follows:

Preferably, a long narrow drill or slot $b$ is formed in the seed bed having the shape of a V in cross-section; the seed are placed in the lower angle of this drill and may be pressed in by the ridge $c^2$ of the trough $c$ or the drill may be formed by pressing the ridge of the formed strip, shown in Figure 3 or 5 into the ground. The trough $c$ is then placed over the drill with its edges engaging preferably slightly beyond the drill and set firmly enough into the surface $a$ of the bed to hold the trough in position. Water is then poured over the trough wetting the surface of the bed at the edges of the trough and soaking downward to the seed $s$ conveying the moisture to said seed by capillary attraction of the soil.

The bed may be wet before placing the trough in position and water is supplied as required by pouring it directly over the trough allowing it to run down the sides and soak into the surface of the bed to the place where the seed are located. Thus moisture is supplied while the covering retards evaporation from the earth immediately surrounding the seed, thus acting something like a valve admitting moisture but retarding its escape. To accomplish the purpose, obviously, it is necessary that the covering should be of the nature of a strip, that is long and narrow, and its particular form in cross-section is a subordinate consideration. I have successfully used a flat strip covering a V-shaped drill.

In the form shown in Figure 3, foraminous walls are used, the apertures being small enough to prevent any disturbing jet of water passing therethrough; a mist may be permitted to pass through the apertures.

In the device of Figures 5 and 6, the apertures $c^{3b}$ are left open, the water being shed beyond these openings by the overhanging shape of the wall of the trough. In this case the seed are supplied only with diffused light.

The trough may be an inch or an inch and a half in breadth. The trough is put in position once and for all, and left there until the seed has sprouted and developed sufficient roots and strength so that it may be watered directly or exposed to a stronger light when the trough is removed.

The translucent sheets $d$ are slightly obscured so as to prevent the full strength of the sun passing therethrough to the seed and are of a material adapted to the purpose for which they are intended.

The groove $b$ slants down from its sides at an angle of about 30° so that the water will be conveyed to the seed by both gravity and capillary attraction.

In the form of Figures 3 and 5, the light of the sun is admitted to the seed without passing through glass or any other medium that obstructs, or prevents the passage of some portion of the light useful to the germinating seed and plant.

What I claim is:—

1. The method of treating seed for germination, consisting in sowing the seed in the ground, covering the seed with a strip of material that shall shelter the same from water, leaving sufficient room between the seed and said strip to permit the growth of the plant, leaving said strip continuously over the seed until the plant has developed sufficient roots and strength to endure direct watering and direct sunlight and watering the seed by pouring the water over said strip so that it shall be carried to the seed by capillary attraction through the ground.

2. The method of treating seed for germination, consisting in sowing the seed in the bottom of a drill, covering the drill with a strip of material that shall protect the seed from water, said strip resting upon the edges of said drill leaving the strip in position until the plants are formed and supplying water to the surface of the bed adjacent to the edges of said strip of material so that it shall be carried to the seed by capillary attraction.

3. The method of treating seed for germination, consisting in sowing the seed in the bottom of a drill, covering the drill with a strip of material that shall protect the seed from water and shall admit light therethrough, said strip of material resting with its edges adjacent to the edges of said drill and supplying water to the surface of the seed bed adjacent to the edges of said strip so that it shall be carried to the seed by capillary attraction.

4. The method of treating seed for germination, consisting in sowing the seed in a row in the seed bed, covering the seed with a strip of material that shall shed water, said strip of material having its edges engaging said seed bed upon both sides of the row of seeds and adjacent thereto, and supplying water to the surface of the seed bed adjacent to the edges of said strip so that it shall be carried to the seed by capillary attraction.

5. The method of treating seed for germination, consisting in sowing the seed in a row in the seed bed, covering the seed with a strip of material that shall shed water, said strip of material having its edges engaging said seed bed upon both sides of the row of seeds and adjacent thereto, and supplying water to the surface of the seed bed adjacent to the edges of said strip so that it shall be carried to the seed by capillary attraction through the ground, said strip being so formed as to leave room over the seed for the formation of the plants.

6. The combination with a seed bed having a row of seed therein, of a strip of material adapted to shed water of the shape in cross section of an inverted trough, the edges of said trough engaging said seed bed upon opposite sides of the row of seed and closely adjacent thereto for the purpose described.

7. The combination with a seed bed having a row of seed therein, a strip of material adapted to shed water having the shape of an inverted trough, said strip having its edges engaging said seed bed upon opposite sides of said row of seed and adjacent thereto, said strip being provided with apertures therethrough that shall permit the passage of light but prevent the passage of a jet of water.

8. The combination with a seed bed having a row of seed therein, a strip of material adapted to shed water having the shape of an inverted trough, said strip having its edges engaging said seed bed upon opposite sides of said row of seed and adjacent thereto, said strip being provided with apertures therethrough, said apertures being covered with a translucent material that shall prevent the passage of water.

9. The combination of a seed bed, a row of seeds thereon, and a strip of material that shall shed water covering said seed, said strip engaging the bed on both sides of the row, said strip being provided with unobstructed apertures that shall exclude water but admit sunlight, for the purpose described.

10. The method of treating seed for germination, consisting in sowing the seed in the ground, protecting the seed so as to shelter the same from water, leaving room between the seed and protector for the growth of the plant, continuously protecting the seed until the plant has developed to stand direct watering and sunlight, and watering the seed by pouring water over the protector so that it will be carried to the seed by capillary attraction through the ground.

In testimony whereof, I sign this specification.

ELLIOTT J. STODDARD.